United States Patent [19]

Luxon

[11] Patent Number: 4,615,948
[45] Date of Patent: Oct. 7, 1986

[54] POLYPHENYLENE ETHER BLENDS CONTAINING ELECTROSTATICALLY BOUND ADDITIVE

[75] Inventor: Bruce A. Luxon, Stamford, Conn.

[73] Assignee: General Electric Company, Selkirk, N.Y.

[21] Appl. No.: 755,021

[22] Filed: Jul. 15, 1985

Related U.S. Application Data

[60] Division of Ser. No. 669,461, Nov. 7, 1984, Pat. No. 4,537,925, which is a continuation-in-part of Ser. No. 596,559, Apr. 4, 1984, abandoned.

[51] Int. Cl.[4] .............................................. B32B 7/10
[52] U.S. Cl. ................................... 428/420; 428/413; 428/414; 428/476.9; 428/483; 428/500
[58] Field of Search .................... 428/420, 476.9, 483, 428/500, 413, 414

[56] References Cited

U.S. PATENT DOCUMENTS

| | | | |
|---|---|---|---|
| 4,123,475 | 10/1978 | Abolins et al. | 524/158 |
| 4,127,558 | 11/1978 | Cooper et al. | 525/905 |
| 4,299,748 | 11/1981 | Hashizume | 428/500 |
| 4,341,882 | 7/1982 | Katchman | 525/68 |
| 4,384,063 | 5/1983 | Luxon | 524/159 |

FOREIGN PATENT DOCUMENTS 22474  10/1972  Japan ................. 525/333.5

Primary Examiner—Jacob Ziegler
Attorney, Agent, or Firm—Michael J. Doyle

[57] ABSTRACT

Compositions of a polyphenylene ether resin, poly(alkenyl aromatic)resins having pendant highly polar ionic groups and additives capable of electrostatic bonding with the polar ionic groups are described. Especially useful as the ionic groups are sulfonate groups and as the additive are antistatic agents. The additives are more stable against losses due to migration, volatilization, washing out and the like, due to the electrostatic attraction to the ionic groups on the poly(alkenyl aromatic)resins.

16 Claims, No Drawings

POLYPHENYLENE ETHER BLENDS CONTAINING ELECTROSTATICALLY BOUND ADDITIVE

CROSS-REFERENCE TO RELATED APPLICATION

This is a division, of application Ser. No. 669,461 filed Nov. 7, 1984, now U.S. Pat. No. 4,537,925, which is a continuation-in-part of application Ser. No. 596,559, filed April 4, 1984, now abandoned.

BACKGROUND OF THE INVENTION

Many synthetic thermoplastic polymers are poor conductors, or nonconductors, of electricity. A consequence is that after the polymer or a blend of the polymer and other ingredients has been fashioned into a molded article, coating, film or fiber, electrostatic charges tend to accumulate on the surface and are not freely dissipated. This is especially characteristic of polymers having surface resistivities greater than $10^{12}$ (ohms or ohms/square), many of which are commercially important. Electrostatic charges can accumulate on the surface of these polymeric materials to levels equivalent to 20,000 to 30,000 volts. Even with lower levels of static build-up, however, many undesirable effects can still occur. Contact with synthetic materials in automobile seat covers, floor rugs, clothing, and so forth may create a high static charge on a person which, when subsequently discharged by contact with a grounded object, causes an unpleasant sensation of shock. The accompanying spark, moreover, can create a serious hazard in flammable or explosive atmospheres, such as found in hospital operating rooms (anesthesia gases) and underground excavations for the mining of ore.

The problem is especially acute in the electronics industry, where relatively low static charges can result in a catastrophic failure of sensitive micro-electronics devices, and in the business machine industry, where paper jam-ups in photocopiers are often directly attributable to the accumulation of electrostatic charges as the copy paper passes over plastic platens and guides.

Various ways have been proposed in the past for treating at least some of these polymers to make them more dissipative of surface charges. Some involve modification of the polymer itself. For instance, Ohya, et al., in U.S. Pat. No. 4,384,078, have proposed that a more static resistant polymeric material can be obtained by graft polymerizing a vinyl or vinylidene monomer, such as sodium styrene sulfonate, onto a rubbery copolymer of an alkylene oxide and a conjugated diene. The resulting product is said to be blendable with other thermoplastic resins and utilizable in conjunction with conventional antistatic agents. Borman, on the other hand, has disclosed in U.S. Pat. No. 3,259,520 that polyphenylene oxide resins can be altered to be antistatic by forming certain ionic derivatives through nuclear substitution with groups such as sulfonate groups.

Still other methods involve the formation of blends of antistatic agents with the polymer. Castro, et al., in U.S. Pat. No. 4,210,556, teach that a liquid ethoxylated amine such as N,N-bis(2-hydroxyethyl) alkenyl or a mixture of alkenyl and alkenyl amines can be admixed with a polymer, for example, a polyolefin or polyphenylene oxide, to form a homogeneous liquid which can then be cooled to a solid antistatic agent. The solid can be blended into a polymer to impart antistatic properties.

Baron, et al., in U.S. Pat. No. 3,933,779, disclose that certain bis-ethoxylated quaternary ammonium salts of paratoluene sulfonic acid are useful as antistatic agents for various synthetic polymers, including polystyrenes, polyesters, polyamides, polycarbonates, polyolefins, and ABS resins.

Abolins and Katchman have found that an antistatic agent based on a mixture of triethanolamine, toluene sulfonic acid and sodium lauryl sulfate, is an effective additive for polyphenylene ether resins and blends. This discovery is described in U.S. Pat. No. 4,123,475.

Japan Pat. No. 47-22474 discloses that certain metal salts of a sulphonated vinyl aromatic compounds, for example, sulphonated polystyrene, are useful as antistatic agents for polymeric materials.

U.S. Pat. No. 4,341,882 describes blends of polyphenylene ether, polystyrene and an antistatic agent which can be a styrene-allyl alcohol copolymer, an anionically polymerized poly(ethylene oxide) and a combination of both.

More recently, Luxon has shown in U.S. Pat. No. 4,384,063 that the antistatic behavior of N,N-bis-(2-hydroxyethyl-N-octyl-N-methyl ammonium para toluene sulfonate (also identified in the above mentioned Baron, et al. patent as methyl-octyl-bis(2-hydroxyethyl) ammonium para-toluene sulfonate), is enhanced in a polyphenylene ether resin blend when used in conjunction with a small amount of a polyethylene glycol ester.

Polymer blends modified by the addition of antistatic compounds based on amines often suffer from certain deleterious effects, however. The additive can often be removed from the surface of a molded part by simply rinsing with water or a non-aqueous solvent, and this detracts from the surface antistatic behavior. In the case of some polymers where migration of the additive to the surface occurs, the antistatic effect may return after only several hours or days. For other polymers, however, examples of which are polyphenylene ether resins and polystyrenes, the antistatic behavior recovers much more slowly, and may not fully return for several months. Moreover, many antistatic amines have poor compatibility with the polymer, a result of which is that only small amounts of the additive will be tolerated. The latter phenomenon can present the following dilemma. On the one hand, the use of concentrations of additive above the threshold of compatibility may lead to processing difficulties during injection molding. Typically, this is manifested by extruder screw slippage as a result of lubrication from excess (incompatible) amounts of the additive, and by erratic molding cycle times. On the other hand, the relatively small amounts of additive dictated by these processing requirements necessarily limits the antistatic performance of the molded article.

SUMMARY OF THE INVENTION

This invention provides, in one aspect, compositions of (a) a polyphenylene ether resin, (b) an alkenyl aromatic resin having highly polar ionic substituents, or groups, appended to the polymer chain, and (c) one or more property modifying additives which are electrostatically bound to component (b) through the charged substituents.

The aforementioned substituents, which are characterized by a high charge density, will also be referred to in this disclosure as "ionomeric" substituents.

The compositions of this invention are capable of tolerating larger amounts of the additives than previously possible while avoiding the aforementioned problems usually associated with them, due to the electrostatic attraction between the additive and charged pendant groups of the alkenyl aromatic resin. More specifically, the additive is more resistant to being washed out, and processing difficulties such as screw slippage and erratic molding cycle times are sharply reduced or entirely eliminated.

Another aspect of the invention comprises articles molded from the described blend compositions of (a), (b) and (c).

Still another aspect involves articles molded from blends of (a) and (b), with (c) being applied on the surface of the article.

Notably, the present invention extends not just to antistatic agents, but also to the use of any additives or types of additives capable of electrostatic attraction to component (b).

This invention is especially efficacious for a number of reasons. For instance, the properties of electrostatic decay and ultraviolet (UV) light degradation are, for the most part, surface effects. The melt blending of an antistatic agent or UV stabilizer into the resin matrix normally requires much more active ingredient than otherwise necessary if the additive were confined merely to the surface of the molded article. In practice, the additive, being more or less uniformly distributed throughout the bulk of the molded article, is mostly wasted because only that amount actually on the surface is useful to achieve the desired result. Thus, the majority of the additive is spent in needlessly filling up the interior of the molded article. These agents could, of course, be topically applied to the resin but, in the normal case, they subsequently would tend to be easily rubbed or washed off during normal use. With the present invention, the ionic groups on the poly(alkenyl aromatic)resin tenaciously bind the additive, e.g., UV-stabilizer or antistatic agent, to the surface of the article, preventing or minimizing its removal. The invention thus permits use of the additive either as an ingredient incorporated in the resin matrix itself, or safely applied to and affixed on the surface of an article molded from the matrix.

Good melt flow is another important property in the case of polyphenylene ether resin molding compositions. The property is often measured as channel flow length, with longer lengths representing better melt flow. Flow improvements are conventionally obtained by the addition of plasticizers which are typically dispersed throughout the resin matrix. Unfortunately, such improvements are all too often accompanied by decreases in the heat distortion temperature of the molded composition, making the moldings more susceptible to effects such as warpage and the like when exposed to above normal temperatures. Thus, many commercial molding compositions represent a compromise, falling somewhere between as high a heat distortion temperature as possible, on the one hand, and as long a channel flow as possible, on the other hand. Heretofore, one could rarely optimize both properties.

Increased melt flow is a highly sought after property. Longer melt flow easily translates into reduced cycle times, lower pressures, lower temperatures, and reduced equipment costs, and concomitantly, increased productivity, lower energy costs and reduced capitalization.

With the present invention, melt flow enhancing additives such as plasticizers manifest an improved combination of high melt flow and high heat distortion temperature, apparently again due to the electrostatic interfacing between the aforementioned pendant ionic groups and the plasticizer.

DESCRIPTION OF THE INVENTION

Preferred polyphenylene ether resins for use as component (a) are homopolymers or copolymers having units of the formula

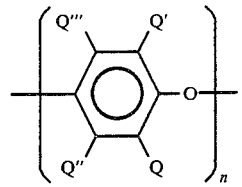

in which Q, Q', Q" and Q''' are independently selected from the group consisting of hydrogen, halogen, hydrocarbon radicals, halohydrocarbon radicals, hydrocarbonoxy radicals and halohydrocarbonoxy radicals; and n represents the total number of monomer units and is an integer of at least about 20, and more usually at least 50.

These resins are, in general, self-condensation products of monohydric, monocyclic phenols produced by reacting the phenols with oxygen in the presence of complex metal catalysts, with the molecular weight being controlled by the reaction time, longer times providing a higher average number of repeating units. Particular procedures are known to those skilled in the art and are described in the patent literature, including the Hay and Stamatoff patents mentioned above.

Suitable phenolic monomers include but are not limited to: 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylpheonol; 2-methyl-6-ethylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Some of the polymers which can be produced and which are within the above formula are: poly(2,6-dilauryl-1,4-phenylene)ether; poly(2,6-diphenyl-1,4-phenylene) ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly (2,6-dibenzyl-1,4-phenylene)ether; poly(2-ethoxy-1,4-phenylene)ether; poly(2-chloro-1,4-phenylene)ether; poly(2,6-dibromo-1,4-phenylene)ether; and the like.

Also included within the above formula are copolymers prepared from mixtures of phenolic monomers. Special mention is made of those based on the reaction of 2,6-dimethylphenol with other phenols, for example, with 2,3,6-trimethylphenol or 2-methyl-6-butylphenol, to produce the corresponding copolymer, for example, poly(2,6-dimethyl-co-2,3,6-trimethylphenol), poly(2,6-dimethyl-co-2-methyl-6-butylphenol), and so forth.

Especially preferred for use in this invention are homopolymers having alkyl substituents in the two positions ortho to the oxygen ether atom, that is, those of the above formula in which Q and Q' are alkyl, and particularly alkyl having from 1 to 4 carbon atoms. Most preferred is poly(2,6-dimethyl-1,4-phenylene ether).

The polyphenylene ether resin may also be used together with other polymers in the present kinds of blends, for example, with aromatic polycarbonates, polyesters, polyamides, poly(vinyl chlorides) and so forth. Particularly preferred are poly(alkenyl aromatics), for example, polystyrene, which are essentially non-ionomerized, that is, devoid of the aforementioned ionic substitutents mentioned above with respect to component (b). Examples of such suitable poly(alkenyl aromatics) are disclosed in Cizek, U.S. Pat. No. 3,383,435. Amounts ranging from 99:1 to 1:99, stated as a weight ratio of these two polymers, are permissible for use in this invention.

Component (b) is, as explained, a polymer which contains highly polar pendant ionic substituents, that is, substituents having a high charge density.

The ionomeric substituents are preferably strongly acidic or strongly basic groups, most often acidic, or salts thereof. Examples are sulfonic acid (which are most preferred), phosphorous acid and quaternary ammonium base groups and their salts which are stable at the processing temperatures of the compositions of this invention.

Examples of suitable acid salts are those of metals, ammonium, alkylammonium, phosphonium and alkyl phosphonium. The metal salts are illustrated by alkali metals, alkaline earth metals and zinc. Typical basic salts are the chlorides, bromides, sulfates, sulfonates, and phosphonates.

Component (b) is preferably an elastomeric polymer or a polymer that has been modified with a rubber, any of which will serve to upgrade the impact resistance of the composition after molding. Preferred elastomeric polymers are those having a carbon atom backbone, including but not limited to natural rubber; synthetic diene rubbers, e.g., polybutadiene and polyisoprene; butyl rubbers; polyisobutene rubbers; ethylene-propylene rubbers; ethylene-propylene-diene rubbers; chloroprene rubbers, and others known in the art.

Especially preferred for component (b), however, are elastomertic co- and terpolymers or rubber modified homopolymers based alkenyl aromatic compounds of the formula

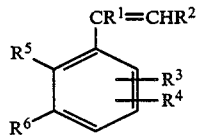

wherein $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or alkenyl groups of from 1 to 6 carbon atoms, or $R^5$ or $R^6$ may be concatenated together with hydrocarbyl groups to form a naphthyl group.

Examples include rubber modified high impact polystyrene (HIPS), styrene-acrylonitrile (SAN) rubber, styrene-butadiene (SBR) rubber, linear, graft and radial teleblock copolymers of styrene and butadiene (or of styrene and isoprene), styrene-acrylonitrile-butadiene (ABS) terpolymers, and so forth.

Component (b) may also be an elastomeric polymer having a hetero backbone, that is, containing more than one element in the polymer chain. Such elements may include, for instance, carbon, oxygen, nitrogen and silicon. Illustrative of these polymers are polyurethanes, polyethers and polysiloxanes.

Ionomerization of component (b) to add the ionic substituents, or groups, may be carried out using methods known in the art. For example, sulfonate groups may be incorporated by reaction of the polymer with sulfonating agents such as sulfur trioxide or acetyl sulfate, or in the case of an addition polymer by polymerizing a monomer system which includes a sulfonated monomer such as sodium styrenesulfonate. Quaternary ammonium groups may be introduced by nitration followed by reduction and quaternization; phosphonic acid groups by nitration, reduction, formation of a diazonium salt (e.g., the fluoroborate), reaction of the salt with phosphorus trichloride, and hydrolysis.

In general, the degree of ionomerization is dependant on the amount of additive(s) to be added to the composition. It is necessary only to incorporate enough ionic groups to satisfactorily compatibilize the additive, but adding an excess amount of groups is not precluded. Typically, the degree of ionomerization of component (b) is about 0.1 to about 10 mole percent.

For component (c), any conventional additive or combination of two or more additives may be selected which are electrostatically attracted to the ionic groups of component (b) dispersed throughout the blend. The same or similar effects of electrostatic bonding should be exhibited, whether the additive functions as a conductive antistatic agent, a color stabilizer, an ultraviolet light stabilizer, plasticizer, and so forth. Special mention is made, however, of additive compounds having an amine functionality, and especially quaternary or tertiary amine antistatic agents.

Especially preferred are antistatic compounds such as described in the above-cited Baron, et al. patent, having the formula:

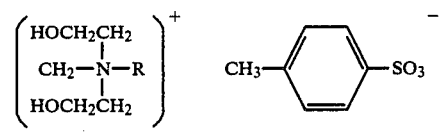

in which R is alkyl of from 4 to 18 carbon atoms, unsubstituted or substituted with halo or aryl.

Most preferred for use in this invention is methyl-octyl-bis(2-hydroxyethyl)ammonium para-toluene sulfonate (the compound of the above formula where R is octyl), which is also termed N,N-bis-(2-hydroxyethyl)-N-octyl-N-methyl ammonium para-toluene sulfonate.

Relative amounts of (a), (b) and (c) can vary widely in accordance with this invention. For instance, the blends can comprise from about 5 to about 95 parts by weight of component (a) and from about 95 to about 5 parts by weight of component (b), with component (c) bein present in concentrations of from about 1 to about 15 parts by weight for each 100 parts of (a) and (b) combined.

The preferred embodiments of this invention will be formulated in accordance with the following:

| Ingredients | Amount, Parts by Weight |
| --- | --- |
| Polyphenylene oxide | about 27.8 to about 50.0 |
| Non-sulfonated polystyrene | about 64.8 to about 21.4 |
| Sulfonated polystyrene, (b) | about 4.6 to about 17.9 |
| Antistatic agent, (c) | about 2.8 to about 10.7 |
| based on a total of 100 parts of (a), (b) and (c) together. | |

The compositions may be prepared for molding by forming a dry admixture of the ingredients, which is then extruded and injection molded into a shaped article. As mentioned, depending on requirements the additive may be included in the blend or coated on the surface of the blend after molding.

Various types of articles may be produced and, in general, the same kinds known to be prepared from engineering resins and plastics in general. By way of illustration, the blends of this invention may be fabricated into personal care products, such as hair dryers and hair curling irons; household articles, such as clothes irons, coffee makers and food processors; interior panels and exterior grilles and decorative trim for automobiles; housings and internal component parts, e.g., guides, in computers or business machines; TV or radio cabinets; and so forth.

DESCRIPTION OF THE SPECIFIC EMBODIMENTS

The invention is illustrated in the examples below, which are intended for instructive purposes and is not meant to be limiting. Amounts are stated in parts by weight. Static decay was measured using an ETS Model 406B Static Decay Meter, in accordance with Federal Test Method 101B, without conditioning.

EXAMPLE 1

The compositions shown below were prepared by mixing the ingredients, passing the mixture through a twin-screw extruder at 540° F., cooling the extrudate and chopping it into pellets, and injection molding the pellets into test pieces using an injection temperature of 450° F. and a mold temperature of 150° F.

The test results (antistatic behavior is expressed as "static decay time") are reported in Table 1.

TABLE 1

| INGREDIENTS | 1 | 1A* | 1B* |
| --- | --- | --- | --- |
| Poly(2,6-dimethyl-1,4-phenylene ether) resin | 50 | 55 | 50 |
| High impact rubber modified polystyrene resin | 35 | 45 | 25 |
| Isopropylated triphenyl phosphate flame retardant/plasticizer | 8 | 10 | 8 |
| Tridecyl phosphate | 0.5 | 0.5 | 0.5 |
| Zinc oxide | 0.15 | 0.15 | 0.15 |
| Zinc sulfide | 0.15 | 0.15 | 0.15 |
| Erucamide | — | 1.5 | — |
| Polyethylene | 1.0 | — | 1.5 |
| Polyethylene glycol | 0.5 | — | — |
| Methyl-octyl-bis(2-hydroxyethyl) ammonium para-toluene sulfonate (Hexcel 106-G antistatic agent) | 5 | 3 | — |
| Nopcostat 2152 P | — | 1 | — |
| Sulfonated polystyrene (4 mol % sulfonation) | 15 | — | 25 |
| Static Decay Time 5000 VDC to ground at 15% rel. humidity, 23° C. | | | |
| (1) As molded | 1.0 sec. | 20 sec. | No decay |
| (2) After water wash | 1.0 sec. | No decay | N/A |
| (3) After isopropyl alcohol wash | 1.0 sec. | No decay | N/A |
| (4) After automatic dishwasher cycle | 0.1 sec. | No decay | N/A |

N/A = not applicable, no further testing necessary
*comparison experiment

Comparison 1A was included because 3 parts by weight of Hexcel 106G is usually regarded as the upper limit usable without encountering severe processing difficulties as previously described. Comparison 1B was included to show the effect of using the sulfonated polystyrene without an antistatic additive. As can be seen, the test sample of Example 1, in accordance with the invention, is clearly superior.

As is shown, while the Comparison 1A test sample decays a 5000 VDC charge to ground potential in the as molded state, no static decay was observed after it was washed with water, with isopropyl alcohol, and with detergent in a dishwasher. This no decay condition was observed, moreover, for five minutes, after which the test was discontinued. Comparison 1B was even worse. It would not decay an induced static charge even in the as molded (unwashed) condition. The test sample of Example 1, on the other hand, decays a static charge in the as molded condition in only one second, and this ability is unaffected by washing. Moreover, even though it contained more than 3 parts of Hexcel 106G, it was found to be easily processable on the standard injection molding equipment used.

EXAMPLES 2–5

The ingredients listed in Table 2 were melt blended on a 28-mm Werner-Pfleiderer twin-screw extruder using a melt temperature of 540° F., followed by molding into test samples on a 4 ounce capacity Newbury injection molding machine with 450° F. front/450° F. rear/450° F. nozzle/100 rpm/150° F. mold settings.

The channel flow data was collected at 500° F. for all of the test samples. The injection pressure was 10,000 psi. The melt viscosity was measured using an Instron capillary rheometer at 282° C.; the capillary had diameter of 0.050 inch and a length of 1.0 inch. Heat distortion temperature data was determined using $2\frac{1}{4}$ inch $\times \frac{1}{2}$ inch $\times \frac{1}{8}$ inch test bars. The results are shown in Table 2.

TABLE 2

| | 2 | 3 | 4 | 5 | Control |
| --- | --- | --- | --- | --- | --- |
| Ingredients | | | | | |
| Poly(2,6-dimethyl-1,4-phenylene) ether resin | 50 | 50 | 50 | 50 | 50 |
| High impact, rubber modified polystyrene resin | 40 | 40 | 40 | 40 | 40 |
| Isopropylated triphenyl phosphate | 10 | 10 | 10 | 10 | 10 |
| Polyethylene glycol | 1.5 | 1.5 | 1.5 | 1.5 | 1.5 |
| Tridecyl phosphate | 0.5 | 0.5 | 0.5 | 0.5 | 0.5 |
| Zinc oxide | 0.15 | 0.15 | 0.15 | 0.15 | 0.15 |
| Zinc sulfide | 0.15 | 0.15 | 0.15 | 0.15 | 0.15 |
| Sulfonated polystyrene (4 mol % sulfonation) | 10 | 10 | 10 | 10 | 10 |
| Hexcel 106-G (as in Table 1) | 2.5 | 5.0 | 7.5 | 10 | 0 |
| Properties | | | | | |
| Injection channel flow length, inches at 500° F. | 18 | N/A | 26 | N/A | 14 |
| Melt viscosity, 282° C./ | 1214 | 917 | 707 | 551 | 1728 |

TABLE 2-continued

|  | 2 | 3 | 4 | 5 | Control |
|---|---|---|---|---|---|
| 1500 sec$^{-1}$ |  |  |  |  |  |
| Heat distortion temp., °F. (264 psi) | 203 | 207 | 206 | 203 | 207 |

As is shown, the melt viscosity of the composition decreases and, concomitantly, the channel flow length increases with increasing amount of Hexcel 106G, which functions here as a plasticizer. These properties would be expected for a plasticizer. However, it is noteworthy that there is virtually no decrease in the heat distortion temperature, even with amounts of Hexcel 106G as high as 10 parts, which is totally unexpected.

All of the above mentioned patents are incorporated herein by reference.

Other modifications and variations of the invention are possible. It should be understood, therefore, that changes may be made in the particular embodiments shown which are within the scope of the invention defined in the appended claims.

I claim:

1. An article molded from a thermoplastic composition comprising:
    (a) a polyphenylene ether resin, alone, or with another thermoplastic polymer, and
    (b) an alkenyl aromatic resin having pendant polar ionic groups thereon, said article having on the surface thereof
    (c) a layer of one or more property modifying additives electrostatically bound to pendant polar ionic groups of component (b).

2. An article according to claim 1, in which component (a) comprises a polyphenylene ether resin and a poly (alkenyl aromatic) resin.

3. An article according to claim 1, in which the polyphenylene ether resin is poly (2,6-dimethyl-1,4-phenylene) ether.

4. An article according to claim 1, in which the polar ionic groups are selected from the group consisting of strong acid groups, strong basic groups and salts thereof.

5. An article according to claim 1, in which the ionic groups are comprised of a quaternary ammonium salt.

6. An article according to claim 1, in which component (b) comprises units of the formula:

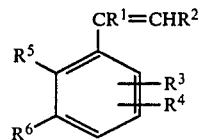

wherein $R^1$ and $R^1$ are selected from the group consisting of lower alkyl or alkenyl groups having from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl or alkenyl groups of from 1 to 6 carbon atoms, or $R^5$ and $R^6$ may be concatenated together with hydrocarbyl groups to form a naphthyl group.

7. An article according to claim 1, in which component (b) is rubber modified.

8. An article according to claim 7, in which component (b) is rubber modified sulfonated polystyrene resin.

9. An article according to claim 1, in which (c) is an antistatic agent.

10. An article according to claim 1, in which (c) is an ultraviolet light stabilizer.

11. An article according to claim 9, in which (c) is of the formula:

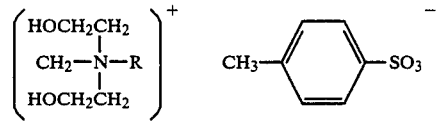

in which R is alkyl having from 4 to 18 carbon atoms, unsubstituted or substituted with halo or aryl.

12. An article according to claim 11, in which component (c) comprises methyl-octyl-bis(2-hydroxyethyl) ammonium-para toluene sulfonate.

13. An article according to claim 1, comprising from about 5 to about 95 parts by weight of (a) and from about 95 to about 5 parts by weight of (b), based on 100 parts of (a) and (b) combined.

14. An article according to claim 1, including a flame retardant agent in the composition of (a) and (b).

15. An article according to claim 14, in which the flame retardant agent is isopropylated triphenyl phosphate.

16. An article according to claim 1 wherein component (b) is a sulfonated polystyrene resin.

* * * * *